United States Patent
Corby, Jr. et al.

(10) Patent No.: US 7,825,393 B2
(45) Date of Patent: Nov. 2, 2010

(54) COMPUTED RADIOGRAPHY SYSTEM AND METHOD FOR MANUFACTURING THE SAME

(75) Inventors: Nelson Raymond Corby, Jr., Scotia, NY (US); Clifford Bueno, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 158 days.

(21) Appl. No.: 11/861,488

(22) Filed: Sep. 26, 2007

(65) Prior Publication Data
US 2009/0078892 A1   Mar. 26, 2009

(51) Int. Cl.
*G01N 23/083* (2006.01)
(52) U.S. Cl. ..................................... 250/582
(58) Field of Classification Search ................. 250/582, 250/584, 586
See application file for complete search history.

(56) References Cited

U.S. PATENT DOCUMENTS

| | | | | |
|---|---|---|---|---|
| 4,517,463 A | * | 5/1985 | Gasiot et al. | 250/585 |
| 4,937,453 A | * | 6/1990 | Nelson | 250/370.09 |
| 5,998,802 A | * | 12/1999 | Struye et al. | 250/584 |
| 6,228,286 B1 | * | 5/2001 | Leblans et al. | 252/301.4 H |
| 6,307,212 B1 | * | 10/2001 | Huston et al. | 250/580 |
| 7,244,955 B2 | | 7/2007 | Bueno et al. | |
| 2004/0094731 A1 | * | 5/2004 | Arakawa | 250/585 |
| 2007/0153975 A1 | * | 7/2007 | Mair et al. | 378/98 |

OTHER PUBLICATIONS

J.A. Seibert et al.; "Dual Energy Radiography Using Active Detector Technology"; Nuclear Science Symposium, 1996. Conference Record., 1996 IEEE; vol. 2, pp. 1244-1247.

* cited by examiner

*Primary Examiner*—David P Porta
*Assistant Examiner*—Marcus H Taningco
(74) *Attorney, Agent, or Firm*—Joseph J. Christian

(57) ABSTRACT

A computed radiography system is provided. The computed radiography system includes an imaging plate configured to store a radiation energy pattern of an object or emit multiple prompt emission photons of the radiation energy pattern upon irradiation or a combination thereof. The computed radiography system also includes at least one light source configured to illuminate at least a sub-area of the imaging plate for a time period of less than about a second. The at least one light source is configured to stimulate at least one of an emission of multiple photons of the radiation energy pattern stored in the imaging plate. The computed radiography system further includes a two dimensional imager configured to capture at least one two dimensional image from the at least a sub-area of the imaging plate using one of an image emitted from the radiation energy pattern stored or an image emitted from prompt emission or a combination thereof.

16 Claims, 5 Drawing Sheets

COMPUTED RADIOGRAPHY SYSTEM AND METHOD FOR MANUFACTURING THE SAME

BACKGROUND

The invention relates generally to computed radiography systems and methods and more particularly, to computed radiography systems and methods utilizing a two-dimensional imager.

Computed radiography systems employ imaging techniques that capture radiation as they pass through an object to be imaged using an imaging plate coated with a storage phosphor. The object to be imaged is typically exposed with X-rays, and a latent X-ray image is formed on the imaging plate. The storage phosphor on the imaging plate when stimulated with a low energy scanned light beam (such as a laser beam) releases visible light at locations where X-rays are absorbed. The light is then captured and converted into an electrical signal, which is subsequently converted to data that can be transmitted to remote systems or locations and displayed on laser-printed films or softcopy workstations and stored digitally.

Typically, only a portion of the X-ray energy deposited onto the computed radiography phosphor plate is generally stored. A substantial amount of light due to the impinging X-ray energy is emitted promptly at the time of exposure, which is generally not captured by a detector. Therefore, much of the energy deposited onto the computed radiography plates is lost due to failure to collect prompt emission. Further, in existing computed radiography reading processes used to retrieve the stored emission information, some signal remains in the phosphor plate, which is typically wasted during the erasure cycle. The X-ray energy losses due to prompt and non-retrieved stored emission reduce the detective quantum efficiency and signal to noise ratio for X-ray exposures that would otherwise result in a much higher image scan quality. In medical applications, this energy is imparted to the patient without benefit of enhanced diagnosis. In non-destructive testing applications, this wasted energy results in longer throughput cycles for collecting imagery than otherwise desired.

It would therefore be desirable to develop an improved system and technique that enables a more complete and efficient energy collection from the imaging plate.

BRIEF DESCRIPTION

In accordance with an aspect of the invention, a computed radiography system is provided. The computed radiography system includes an imaging plate configured to either store a radiation energy pattern of an object or emit multiple prompt emission photons of the radiation energy pattern upon irradiation or a combination thereof. The computed radiography system also includes at least one light source configured to illuminate at least a sub-area of the imaging plate for a time period of less than about a second. The at least one light source is configured to stimulate at least one of an emission of multiple photons of the radiation energy pattern stored in the imaging plate. The computed radiography system further includes a two dimensional imager configured to capture at least one two dimensional image from the at least a sub-area of the imaging plate using at least one of an image emitted from the radiation energy pattern stored or an image emitted from prompt emission or a combination thereof.

In accordance with another aspect of the invention, a method of manufacturing a computed radiography system is included. The method includes providing an imaging plate for storing a radiation energy pattern of an object or emitting multiple prompt emission photons of the radiation energy pattern or a combination thereof. The method also includes providing at least one light source for illuminating at least a sub-area of the imaging plate for a time period of less than about a second. The at least one light source is configured to stimulate at least one of an emission of multiple photons from the imaging plate. The method further includes providing a two dimensional imager for capturing at least one two dimensional image from at least a sub-area of the imaging plate using an image emitted from the radiation energy pattern stored or an image emitted from prompt emission or a combination thereof.

These and other advantages and features will be more readily understood from the following detailed description of preferred embodiments of the invention that is provided in connection with the accompanying drawings.

DETAILED DESCRIPTION

As discussed in detail below, embodiments of the invention include a computed radiography system and a method for manufacturing the same. The computed radiography system disclosed herein includes an illumination method that can economically deliver stimulating energy to an entire plate surface within a short period of time such as, but not limited to, of the order of milliseconds.

Figure 1:
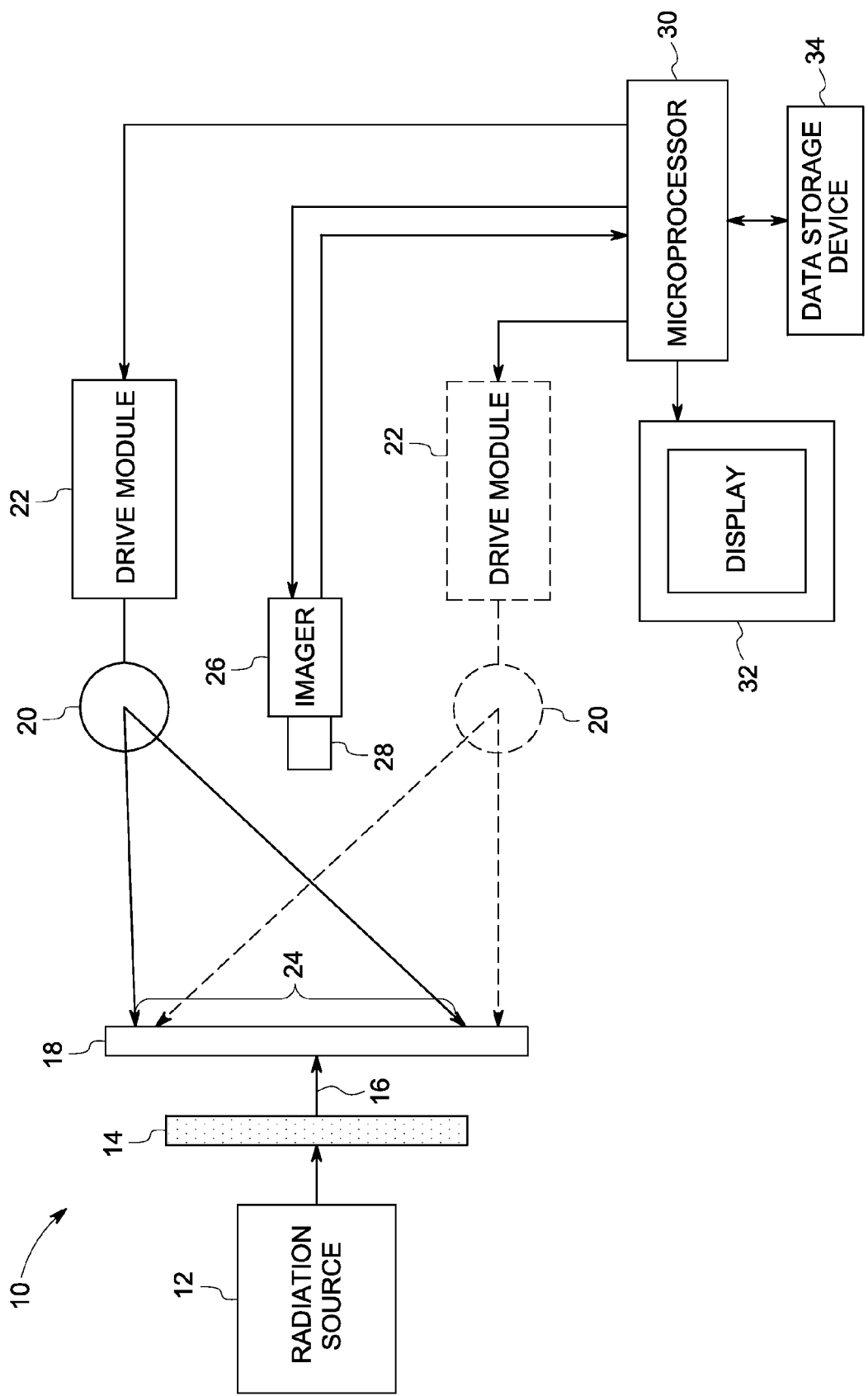
FIG. 1 is a schematic illustration of a computed radiography system in accordance with an embodiment of the invention.

FIG. 1 is a diagrammatic illustration of a computed radiography system 10 including a radiation source 12. The radiation source 12 irradiates an object 14. Non-limiting examples of the radiation source 12 include an X-ray source or a gamma-ray source. Embodiments of the present invention have medical, non-destructive evaluation (NDE), and homeland security applications. In a particular embodiment, the object 14 may comprise a person or animal or portion thereof in a medical application. In another embodiment, the object 14 may, for example, comprise an industrial specimen in a NDE application. In yet another embodiment, the object 14 may be a suspicious briefcase or a bag. A radiation energy pattern 16 of the object 14 due to the radiation source 12 is stored on an imaging plate 18. In a non-limiting example, the imaging plate 18 includes a storage phosphor screen. In another embodiment, the imaging plate 18 emits multiple prompt emission photons of the radiation energy pattern 16 upon irradiation. In yet another embodiment, the imaging plate 18 stores the radiation energy pattern 16 and emits multiple prompt emission photons upon irradiation. At least one light source 20 coupled to a drive module 22 illuminates at least a sub-area 24 of the imaging plate 18 for a time period of less than about a second and stimulates at least one of an emission of multiple photons corresponding to trapped radiation energy pattern 16 from the imaging plate 18. The at least one light source 20 may include multiple physical illumination sources operated in parallel so as to emit energy over the required spectral range. It will be appreciated that the radiation source, 12 may be remote from the imaging computed radiography system, and simply the imaging plate is brought to the radiation source 12, the object 14, and irradiated with radiation energy pattern 16 for later release of the latent image in accordance with methods described below. Other methods can include the use of the radiation source in combination with the computed radiography system as will be described.

When the photons are released, a spectrum of light such as, but not limited to, violet-blue light, is typically emitted from the imaging plate 18. In one embodiment, the imaging plate 18 emits multiple prompt emission photons upon irradiation from the radiation source 12. In another embodiment, the at least one light source 20 includes a strobe. As used herein, the term 'strobe' refers to a high-energy flashlamp often containing a noble gas such as xenon and emitting over a broad spectrum from the deep UV to the infrared. In yet another embodiment, the light source 20 includes multiple pulsed lasers, wherein one or more of the pulsed lasers includes a wavelength different from another respective pulsed laser. In another exemplary embodiment, the at least one light source 20 illuminates for a time period ranging between about 0.1 ms and about 3 ms. The light source 20 may also include a broad spectrum illumination source, filtered incandescent sources, filtered low pressure sodium lamps, light emitting diodes (LED), super luminescent light emitting diodes (SLED), single bulbs or an array of bulbs. A two dimensional imager 26 including a lens, an optical rejection filter and shutter system 28 captures at least one two dimensional image from the sub-area 24 of the imaging plate 18 using at least one of an image emitted from the radiation energy pattern stored or an image emitted from prompt emission or a combination thereof. In an example, the two dimensional imager 26 includes a solid state camera such as, but not limited to, a CCD camera, a CMOS camera and a CID camera. In another embodiment, the two dimensional imager 26 includes a photodiode array. In one non-limiting example, the two dimensional imager 26 is configured to have a linear 16-bit dynamic range and comprises a 4096.times.4096 array.

Further, the two dimensional imager 26 may be designed to have low noise electronics, and multi pinned phase (MPP) CCD logic to provide low dark current for long exposure times. In one embodiment, the two dimensional imager 26 is configured to capture a two dimensional image of a sub-array of the imaging plate 18. In another embodiment, the two dimensional imager 26 is configured to capture a two dimensional image of a magnified region of the imaging plate 18. In other words, if the imaging plate 18 is not completely read-out, it can be read a second time, with a magnified view, and a magnified illumination. In one embodiment, a more concentrated light source 20 may be used to illuminate a portion of the imaging plate 18, and the two dimensional imager 26 may be moved closer to the imaging plate 18 to center in on just that region affording a higher spatial resolution of an area of interest. In addition, a two dimensional image of a sub-array 24 may be acquired with 1:1 optics or with magnification optics, thereby affording a possible increase in spatial resolution in a magnified region. The drive module 22 is coupled to a microprocessor 30 that communicates back and forth with the drive module to automate movement of and to time firing of the light source 20. The microprocessor 30 also captures image data from the two dimensional imager 26 and controls movement of the lens shutter system 28. Furthermore, the microprocessor 30 displays desired data such as, for example, emission spectra of the imaging plate 18 on a display monitor 32. The microprocessor 30 may also store data in a remote location via a data storage device 34.

To achieve maximum collection of incident radiation to the object 14, the system 10 may be used to first collect promptly emitted light while radiation 12 is energized using the imager 26 as used for collection of stored energy. Once the radiation source 12 is disengaged, the imaging plate 18 is read-out by the release of stored radiation with the use of the light source 20. Since the computed radiography system 10 releases light across a wide area all at once to the two dimensional imager 26, the light source 20 may remain active as long as necessary to deplete a large portion of the stored energy, to assure no wastage of radiation imparted to the object 14. An implementation of efficient light collection optics further reduces the wastage. Hence, a maximum signal level may be retrieved by collecting light while the radiation source 12 is active, and after the radiation source 12 is disengaged through release of stored energy with maximal capture of stored energy through exposure times of 1 second or less, and an efficient light collection optics.

In a particular embodiment, where the imaging plate 18 is removed from the computed radiography system 10, for example in field radiography at an oil field, only the stored energy is retrieved. However, the imaging plate 18 may be optimally exposed by the light source 20 to release and capture a majority of the stored energy, assuming said energy is not allowed to dissipate by thermal release over time.

Figure 2:
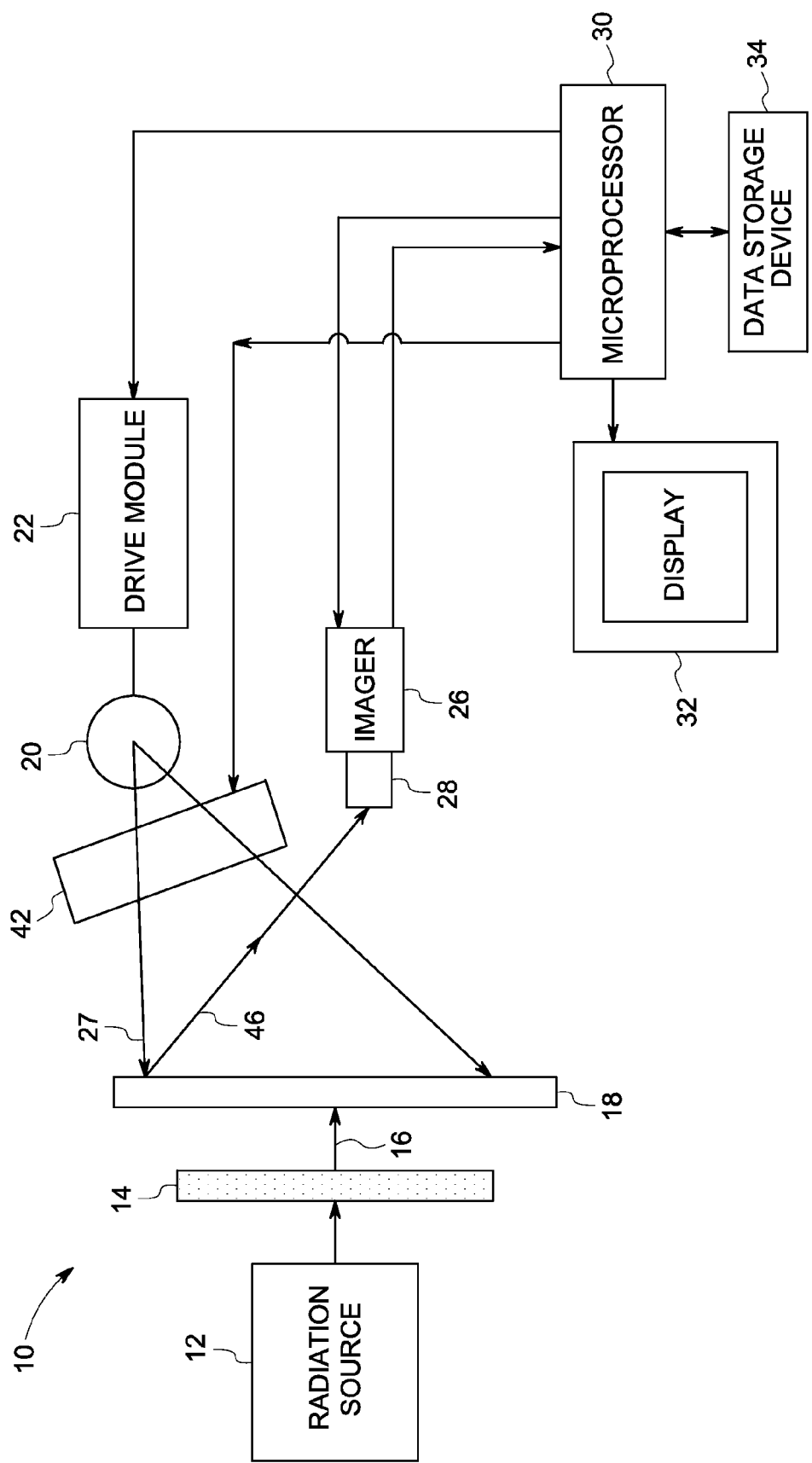
FIG. 2 is a schematic illustration of another computed radiography system including a filter wheel in accordance with an embodiment of the invention.
Figure 3:
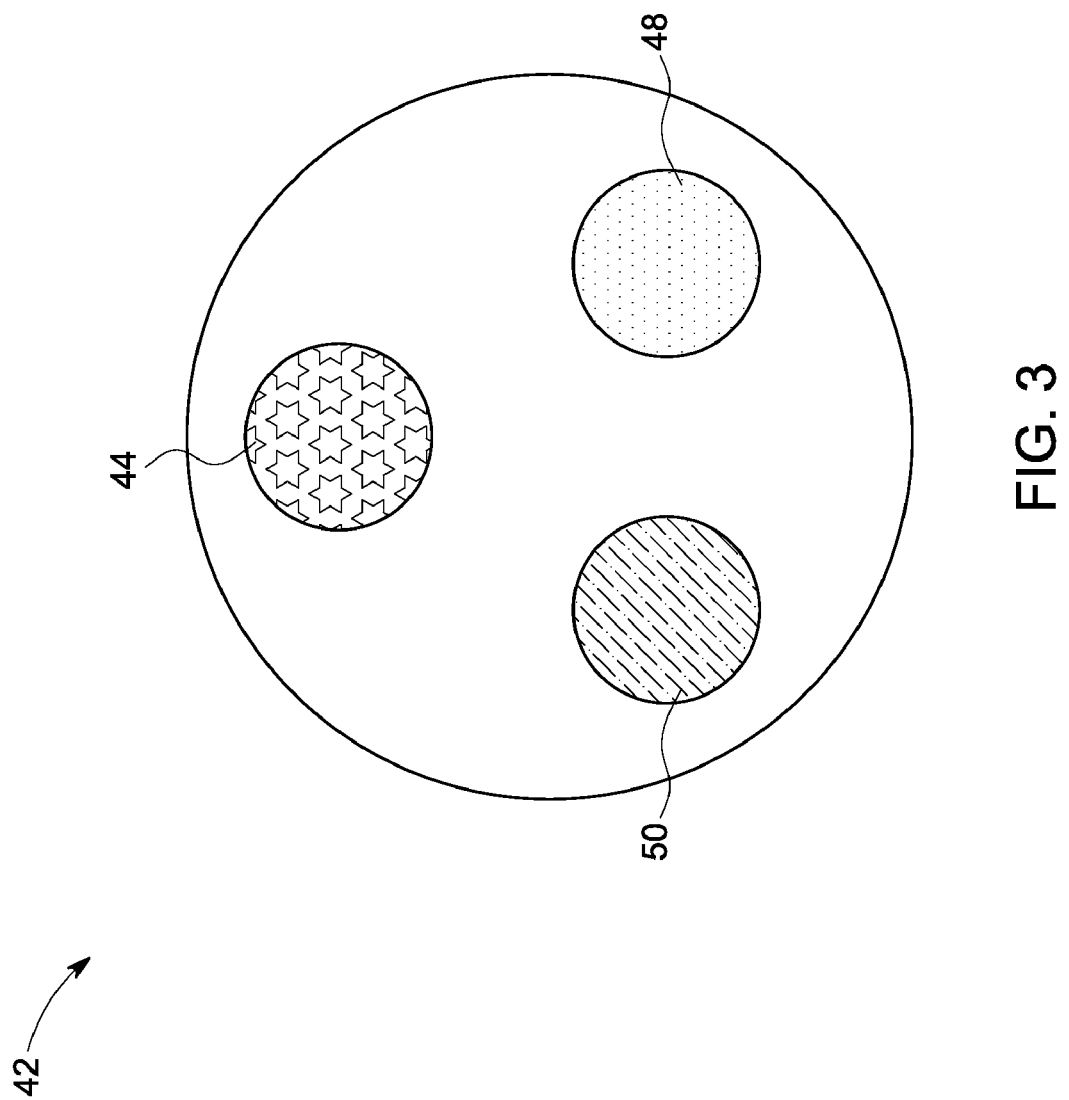
FIG. 3 is a diagrammatic illustration of the filter wheel in FIG. 2.

Referring to FIGS. 2 and 3, the computed radiography system 10 further optionally includes a filter wheel 42 positioned between the light source 20 and the imaging plate 18. The filter wheel 42 filters spectrally radiation coming from the light source 20 with one of three possible spectral characteristics of three filters. It will be appreciated that additional filter wheels 42 may be disposed for respective additional light sources 20. The filter wheel 42 includes a first filter 44 (FIG. 3) that selectively passes illumination 27 from the light source 20 to the imaging plate 18. In a non-limiting example, the first filter 44 is an interference filter. The first filter 44 is tuned for maximal broadband illumination of the imaging plate 18 and is used for read out. A second filter 50 (FIG. 3) in the filter wheel 42 is configured to erase stored information on the imaging plate 18. The second filter 50 is a broad bandpass type optical filter passing maximal energy at wavelengths longer than a stimulated emission wavelength so as to erase the imaging plate 18 at such a position. The filter wheel also includes a third filter 48 (FIG. 3) that is tuned to pass in a narrow ultraviolet (UV) band with a wavelength shorter than a desired stimulated emission wavelength. The third filter 48 is used in correction or calibration of two dimensional non-uniform light transmission characteristics of the system 10 improving a signal-to-noise ratio. An erased imaging plate is illuminated by the UV band resulting in stored charge in much the way the radiation source 12 charged the plate. Imaging plate 18 is then read-out using the first filter 44 and the resulting image is used for calibration of the image obtained of the object 14.

Figure 4:
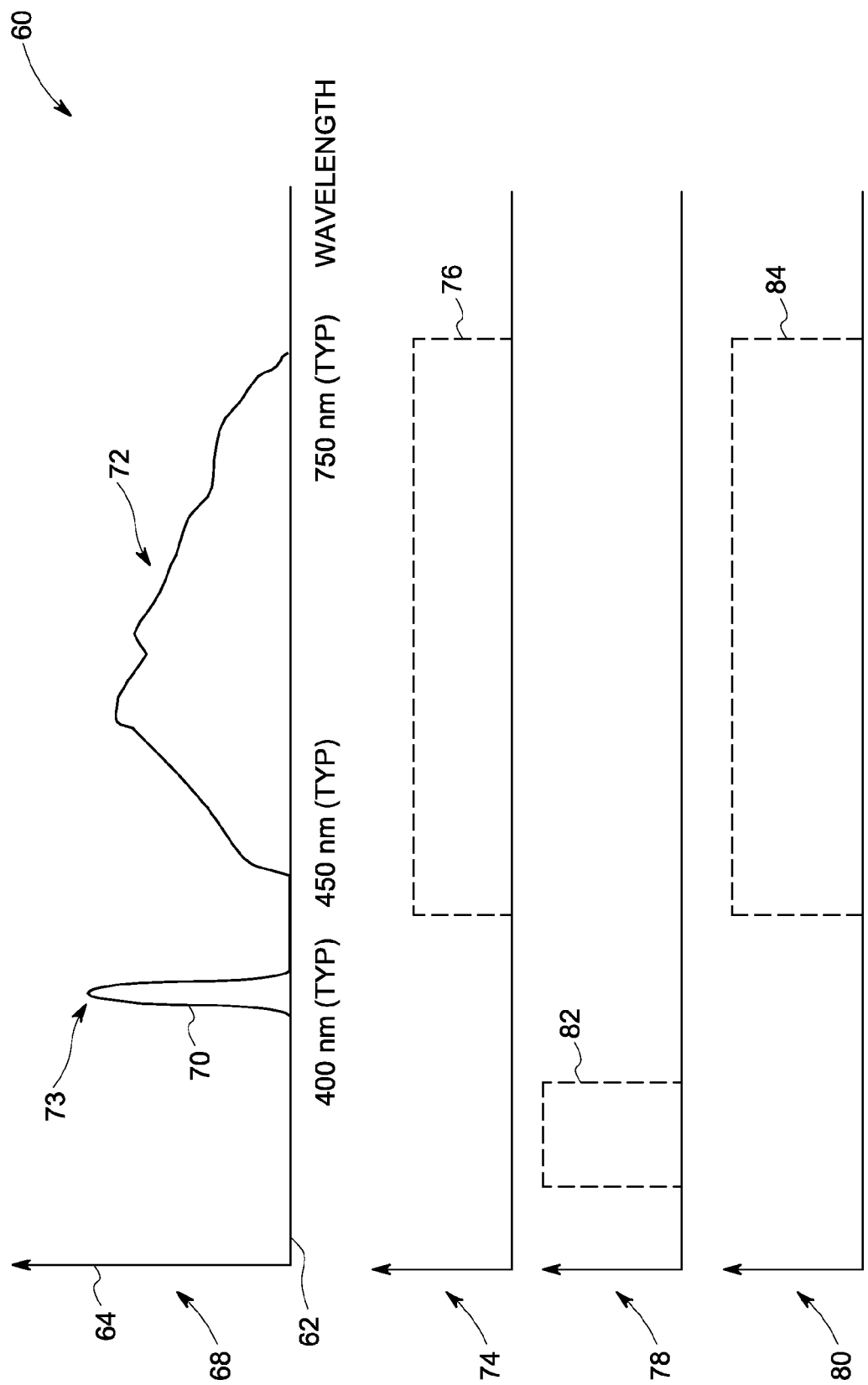
FIG. 4 is a graphical illustration of spectra of an imaging plate and respective filters in the filter wheel in FIG. 2 in accordance with an embodiment of the invention.

FIG. 4 is a graphical illustration of an exemplary characteristic spectral band 60 for the first filter 44, second filter 50 and the third filter 48. The X-axis 62 represents wavelength in nm and the Y-axis 64 represents intensity in arbitrary units of luminosity or in units related to the detector. A characteristic spectrum 68 for stimulation and emission of a typical storage phosphor in the imaging plate 18 is also illustrated. As may be observed, a desired stimulated and prompt emission spectrum 70 of the typical storage phosphor and the stimulating excitation spectral curve 72 have non-over lapping or disjoint wavelengths, thereby allowing the emission spectrum 70 to be recovered in presence of stimulating energy represented by curve 72. The stimulating excitation spectral curve 72 exists in a range between about 450 nm and about 750 nm. The emission spectrum 70 is narrow in width, typically from 50 to 200 nm wide at half height, with a peak or center 73 of the desired emission spectra 70 observed typically at around 400 nm. Spectral band 74 for the first filter 44 illustrates a passband 76 in a similar range as the spectral curve 72 between about 450 nm and about 750 nm. Similarly, spectral bands 78 and 80 illustrate passbands 82, 84 for the third filter 48 and the second filter 50 respectively. The passband 82 ranges between about 250 nm and about 350 nm and is used to directly excite the phosphor to emit promptly so as to use distribution of light emitted as a means to normalize the optical chain of the system. The third filter 48 with passband 82 also serves to store a uniform latent image on the imaging plate 18 for eventual readout by first filter 44 to be used to normalize the optical chain, including the illumination part of the system if so desired. The passband 84 ranges between about 450 nm and about 1000 nm to maximize energy falling on the imaging plate 18 in order to erase information from the imaging plate 18.

In a particular embodiment, the radiation source 12 may be used to either normalize or calibrate or both, the system such that an improved image quality may be obtained. Employing the radiation source 12 without the object 14, or with the use of a flat beam filter typically used by those experienced in the art, enables a calibration image to be created that has information on a two-dimensional beam intensity both in a prompt emission mode and also in a stored or delayed emission mode. While the two dimensional imager 26 may read both the prompt or stored emission, the stored emission is achieved by employing the elements 20 and 42 to release the stored energy.

In a prompt emission mode, non-uniformities such as, but not limited to, phosphor grain noise, intensity variations of the optics, as well as pixel to pixel variation of the two dimensional imager 26 are normalized using exposures without the object 14 such that a resulting image and signal to noise ratio is significantly better than an uncorrected image. Similarly, for release of the stored latent image, using the light source 20, similar non-uniformities may be corrected using the light source 20.

The corrections are typically performed by dividing a darksignal corrected image of the object 14 by an appropriate dark-signal corrected image of a 'blank' or 'no object' image. Acquiring dark corrected imagery is well known to those skilled in the art and involves subtracting bias signals, as well as thermally generated signals in the two dimensional imager 26. The subtractions also reduce stray light, or even stray illumination light from a resulting image.

In a particular embodiment, wherein an x-ray or gamma ray radiation source 12 is not available in the computed radiography system 10, and exposure of the imaging plate 18 is performed remotely, the UV illumination source 48 in the filter wheel 42 may be employed to obtain a correction to phosphor screen noise, illumination optics, and emission signals as the UV light source 48 also creates both a prompt and stored or delayed emission. In a former embodiment, the two dimensional imager 26 may read the prompt emission as long as a UV cut-off filter is used at the imager 26. However, this need not be employed, as the UV light source 48 in numerous imaging plate types will cause the plate to store charge, for later release in much the same way an ionizing radiation does.

The light source, 20, employing filter wheel 44 may be used to release stored information such that the optical system, as well as the structure noise in the phosphor plate may be normalized as described above.

Figure 5:
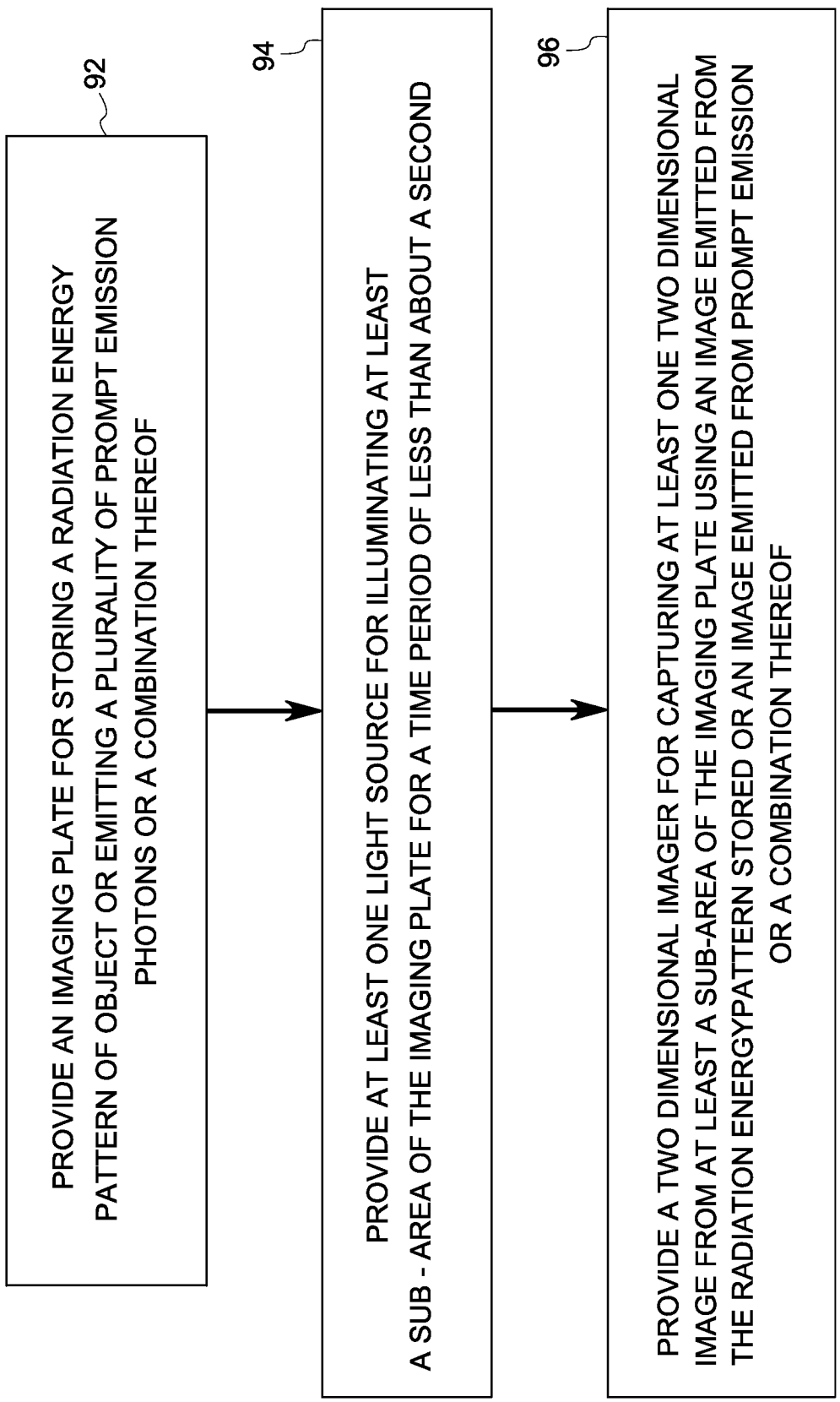
FIG. 5 is a flow chart representing steps in an exemplary method of manufacturing a computed radiography system in accordance with an embodiment of the invention.

FIG. 5 is a flow chart representing steps in an exemplary method of manufacturing a computed radiography system. The method includes providing an imaging plate for storing a radiation energy pattern of an object or emitting a plurality of prompt emission photons of the radiation energy pattern or a combination thereof, as indicated in step 92. At least one light source is provided for illuminating at least a sub-area of the imaging plate for a time period of less than about a second, as indicated in step 94. In a particular embodiment, the at least one light source includes illuminating for a time period between about 0.1 ms and about 3 ms. The at least one light source stimulates at least one of an emission of multiple photons from the imaging plate. A two dimensional imager is provided for capturing at least one two dimensional image from at least a sub-area of the imaging plate using an image emitted from the radiation energy pattern stored or an image emitted from prompt emission or a combination thereof, as indicated in step 96. In an exemplary embodiment, the two dimensional imager includes a solid state camera. Some non-limiting examples of the solid state camera include at least one of a CCD camera, a CMOS camera and a CID camera. In another embodiment, the two dimensional imager includes a photodiode array.

In a particular embodiment, a radiation source is provided for irradiating the object. In another embodiment, a filter wheel is positioned between the light source and the imaging plate, wherein the filter wheel includes a first filter that selectively passes illumination from the light source to the imaging plate. The filter wheel also includes a second filter that calibrates the imaging plate and a third filter that erases the imaging plate.

The various embodiments of a computed radiography system and method described above thus provide a way to achieve a convenient and efficient means of a parallel read out of the imaging plate in the computed radiography system. This technique also decreases time to read the plate increasing system efficiency. Further, the use of intense, brief flash light source allows use of a shorter "exposure" time for a two dimensional imager allowing a non-cooled and cheaper imager to be used. The light source also delivers high energy to the imaging plate in minimal time, thus maximizing amount of signal readout from the imaging plate.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of a CCD camera with respect to one embodiment can be adapted for use with a broad spectrum illumination source described with respect to another. Similarly, the various features described, as well as other known equivalents for each feature, can be mixed and matched by one of ordinary skill in this art to construct additional systems and techniques in accordance with principles of this disclosure.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A computed radiography system, comprising:
   an imaging plate configured to either store a radiation energy pattern of an object or emit a plurality of prompt emission photons of the radiation energy pattern upon irradiation or a combination thereof;
   at least one light source configured to illuminate at least a sub-area of the imaging plate for a time period of less than about a second, the at least one light source configured to stimulate at least one of an emission of a plurality of photons of the radiation energy pattern stored in the imaging plate;
   a two dimensional imager configured to capture at least one two dimensional image from the at least a sub-area of the imaging plate using at least one of an image emitted from the radiation energy pattern stored or an image emitted from prompt emission or an image from an erased imaging plate or a combination thereof; and
   a filter wheel positioned between the light source and the imaging plate, the filter wheel comprising:
      a first filter configured to selectively pass illumination from the light source to the imaging plate to illuminate said plate to emit light of a shorter wavelength that is collected by the two dimensional imager during read out;
      a second filter configured to enable calibration of the imaging plate and an optical path via an excitation source that releases a stored energy pattern; and
      a third filter configured to erase the imaging plate.

2. The computed radiography system of claim 1, wherein the imaging plate comprises a storage phosphor screen.

3. The computed radiography system of claim 1 further comprising an x-ray source or a gamma ray source.

4. The computed radiography system of claim 1, wherein the at least one light source comprises a strobe.

5. The computed radiography system of claim 1, wherein the at least one light source comprises a plurality of pulsed lasers, one or more of the pulsed lasers comprising a wavelength the same or different from another respective pulsed laser.

6. The computed radiography system of claim 1, wherein the two dimensional imager comprises a solid state camera.

7. The computed radiography system of claim 6, wherein the solid state camera is selected from a group consisting of a CCD camera, a CMOS camera and a CID camera.

8. The computed radiography system of claim 1, wherein the two dimensional imager comprises a photodiode array.

9. The computed radiography system of claim 1, wherein the at least one light source is configured to illuminate the at least a sub-area for a time period ranging between about 0.1 ms and about 3 ms.

10. The computed radiography system of claim 1, further comprising a drive module coupled to the at least one light source.

11. A method of manufacturing a computed radiography system comprising:
   providing an imaging plate for storing a radiation energy pattern of an object or emitting a plurality of prompt emission photons of the radiation energy pattern or a combination thereof;
   providing at least one light source for illuminating at least a sub-area of the imaging plate for a time period of less than about a second, the at least one light source configured to stimulate at least one of an emission of a plurality of photons of the radiation energy pattern stored in the imaging plate; and
   providing a two dimensional imager for capturing at least one two dimensional image from at least a sub-area of the imaging plate using an image emitted from the radiation energy pattern stored or an image emitted from prompt emission or an image from an erased imaging plate or a combination thereof; and
   providing a filter wheel positioned between the light source and the imaging plate, the filter wheel comprising:
      a first filter configured to selectively pass illumination from the light source to the imaging plate to illuminate said plate to emit light of a shorter wavelength that is collected by the two dimensional imager during read out;
      a second filter configured to calibrate the imaging plate and an optical path via an ultraviolet excitation source that releases the stored energy pattern and
      a third filter configured to erase the imaging plate.

12. The method of claim 11, comprising providing a radiation source for irradiating the object.

13. The method of claim 11, wherein the providing at least one light source comprises illuminating for a time period between about 0.1 ms and about 3 ms.

14. The method of claim 11, wherein the providing a two dimensional imager comprises providing a solid state camera.

15. The method of claim 14, wherein the providing a solid state camera comprises providing a camera selected from a group consisting of a CCD camera, a CMOS camera and a CID camera.

16. The method of claim 11, wherein the providing a two dimensional imager comprises providing a photodiode array.

* * * * *